United States Patent
Kobayashi

[11] Patent Number: 5,916,054
[45] Date of Patent: Jun. 29, 1999

[54] DRIVING FORCE DISTRIBUTING APPARATUS FOR FOUR WHEEL DRIVE VEHICLE

[75] Inventor: Toshio Kobayashi, Tokyo, Japan

[73] Assignee: Fuji Jukogyo Kabushiki Kaisha, Tokyo, Japan

[21] Appl. No.: 08/889,812

[22] Filed: Jul. 8, 1997

[30] Foreign Application Priority Data

Jul. 30, 1996 [JP] Japan .................................. 8-200740

[51] Int. Cl.$^6$ .................................................. B60K 17/35
[52] U.S. Cl. ........................ 475/220; 475/221; 475/248
[58] Field of Search .................................. 475/248, 249, 475/252, 266, 269, 220, 221

[56] References Cited

U.S. PATENT DOCUMENTS

| | | | |
|---|---|---|---|
| 4,215,593 | 8/1980 | Shono et al. ........................ | 475/221 X |
| 5,135,071 | 8/1992 | Shibahata et al. ...................... | 475/249 |
| 5,205,797 | 4/1993 | Kobayashi et al. ..................... | 475/221 |
| 5,232,415 | 8/1993 | Brewer . | |
| 5,246,408 | 9/1993 | Kobayashi .............................. | 475/221 |
| 5,254,052 | 10/1993 | Kobayashi .............................. | 475/249 |
| 5,376,057 | 12/1994 | Cooper et al. .......................... | 475/248 |
| 5,458,546 | 10/1995 | Teraoka . | |
| 5,458,547 | 10/1995 | Teraoka et al. ........................ | 475/249 |
| 5,484,344 | 1/1996 | Ra et al. ............................... | 475/221 X |

FOREIGN PATENT DOCUMENTS 4-271926  9/1992  Japan .
5-280597 10/1993  Japan .

*Primary Examiner*—Dirk Wright
*Assistant Examiner*—Peter T. Kwon
*Attorney, Agent, or Firm*—Smith, Gambrell & Russell, LLP; Beveridge, DeGrandi, Weilacher & Young Intellectual Property Group

[57] ABSTRACT

A vehicular driving force distribution apparatus includes a first helical sun gear to which an input torque is applied, a first helical pinion meshing with the first sun gear, a second helical pinion rotating integrally with the first pinion, a second helical sun gear from which an output torque is outputted in mesh with the second pinion, a carrier from which another output torque is outputted. And an initial torque generating apparatus comprises a multiple disc clutch and provides between the second sun gear and the carrier for generating an initial torque as a differential limiting torque in between so as to secure a required driving force even on a very slippery road.

4 Claims, 8 Drawing Sheets

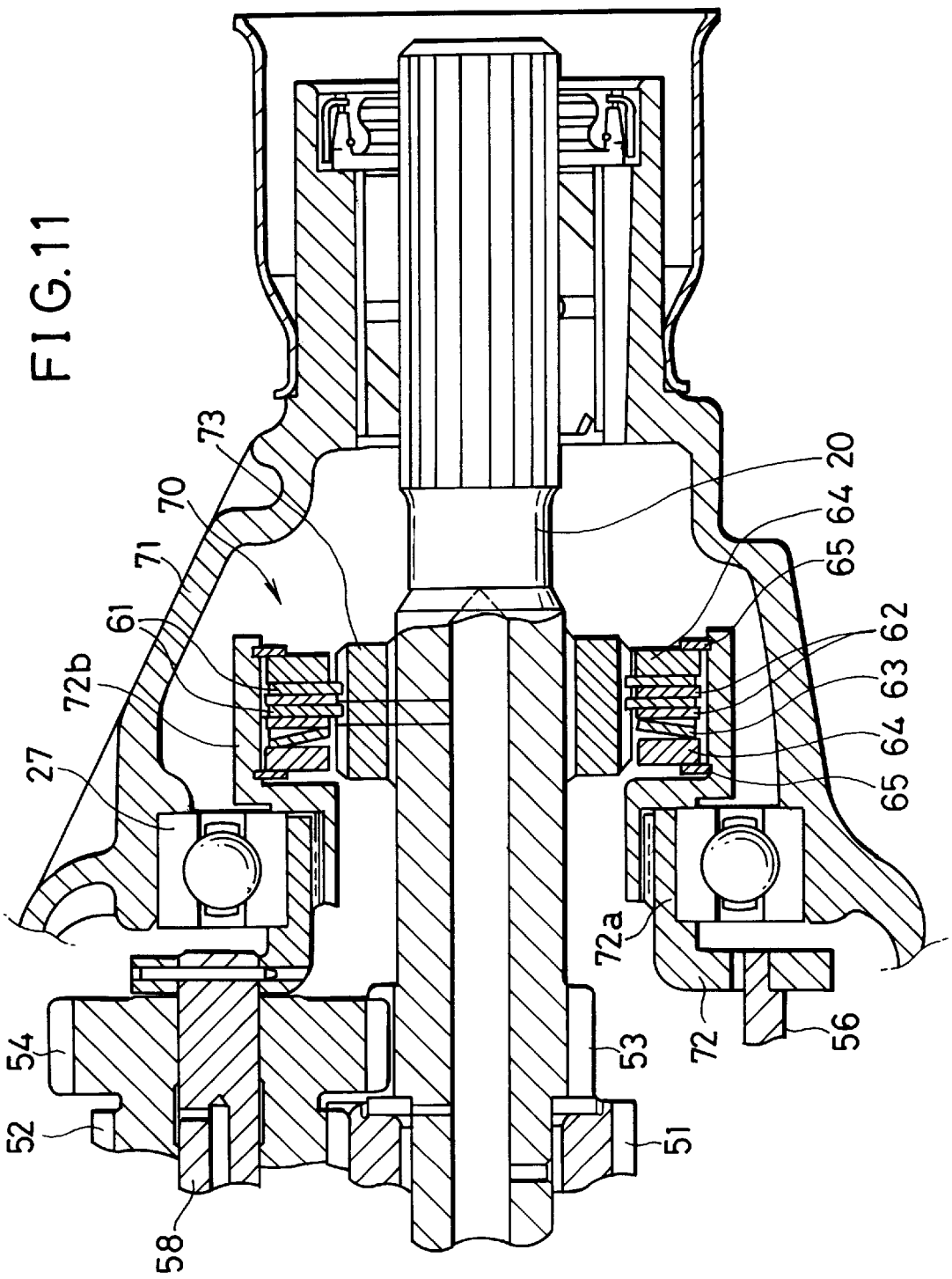

DRIVING FORCE DISTRIBUTING APPARATUS FOR FOUR WHEEL DRIVE VEHICLE

BACKGROUND OF THE INVENTION

1. Field of the Invention

The present invention relates to a driving force distributing apparatus for a four wheel drive vehicle and, in particular, to a driving force distributing apparatus having a function of differential limiting by use of helical gears and an initial torque generating mechanism.

2. Prior Arts

The known driving force distributing apparatus for a four wheel drive vehicle includes a torque distributing apparatus (hereinafter referred to as a center differential apparatus) with a differential limiting function for properly distributing an input torque between front and rear wheels so as to improve a driving performance on a rough road or on a slippery road.

In order to produce a differential limiting torque, there have been proposed several types of differential limiting apparatuses and some of them has come into practical use.

As an example of disclosures, there is a differential proposed in Japanese patent application laid-open No. Toku-Kai-Hei 4-271926. The differential according to this disclosure includes a pair of side gears (worm gears) whose respective end is connected with drive axle ends respectively, a plurality of pairs of element gears (worm wheels) meshing with side gears and at the same time meshing with each other at respective gearing sections provided at both end thereof, a housing for accommodating and supporting the element gears, and bearing members such as thrust washers provided between the ends of the element gears and the housing, so as to generate a differential limiting torque proportional to an input torque.

Further, Japanese patent application laid-open No. Toku-Kai-Hei 5-280597 discloses a differential which comprises a first side gear connected to one output shaft, a second side gear connected to the other output shaft, a first pinion having a first gearing section at one end thereof which meshes with the first sun gear and having a second gearing section at the other end thereof, a second pinion having a third gearing section at one end thereof which meshes with the first gearing section and having a fourth gearing section at the other end thereof which meshes with the second gearing section and at the same time with the second side gear, and a housing having a plurality of holes for accommodating and rotatably supporting a pair of the first and second pinions therein, so as to produce a differential limiting torque by friction forces generated in the meshing portions of gears and the sliding portions between the pinions and the housing or between the pinions and the holes.

However, these torque proportioning type differential limiting apparatuses have such a problem that when the input torque is small, the differential limiting torque is also small. Because of this, in case where the vehicle enters into a road surface with a low friction coefficient or a state of one side wheel floating in the air while the vehicle is operated at relatively low load, the driving force enough for escaping from adverse road conditions can not be secured and the vehicle driving ability is deteriorated.

To solve such problem, it is considered that the when the differential revolution is initiated the differential limiting torque has been raised to some extent beforehand. This differential limiting torque is referred to as an initial torque hereinafter.

In case of the differential limiting apparatus using the combination of worm gears and worm wheels, as described in the aforementioned prior art, it is difficult to provide such a mechanism as to give an effective initial torque in a narrow space of the apparatus. Further, this type of the differential limiting apparatus requires a separate lubricating system because hypoid gear oil containing extreme-pressure additives is needed for lubricating gears. This is disadvantageous in employing automatic transmission oil (ATF) for both the automatic transmission and the differential limiting apparatus.

The case is similar to the differential limiting apparatus using the helical pinion gears and it is difficult to arrange required components so as to give an effective initial torque to the differential limiting apparatus.

SUMMARY OF THE INVENTION

It is therefore an object of the present invention to provide a driving force distribution control apparatus which can provide an excellent driving performance under any road conditions with a simple and compact construction.

A driving force distribution apparatus of a four wheel drive vehicle for distributing a driving force transmitted from the engine into front wheels and rear wheels, comprises:

a first sun gear rotating around a first common axis of rotation and having respective teeth with a first helix angle for transmitting the driving force from the engine;

a first pinion meshing with the sun gear and rotating around a second common axis of rotation, the first pinion having respective teeth with the first helix angle and the second common axis revolving around the first common axis;

a second pinion rotating integrally with the first pinion around the second common axis and having respective teeth with a second helix angle;

a second sun gear meshing with the second pinion and rotating around the first common axis for outputting the first driving force, the second sun gear having respective teeth with the second helix angle;

a carrier rotating around the first common axis and supporting the second common axis for outputting the second driving force; and initial torque generating means provided between the second sun gear and the carrier for generating an initial torque as a differential limiting torque in between so as to secure a required driving force when the driving force is small.

BRIEF DESCRIPTION OF DRAWINGS

FIG. 11 is an enlarged sectional view of another example of a center differential apparatus.

DETAILED DESCRIPTION OF THE INVENTION

An embodiment of the present invention is shown in FIGS. 1 through 11.

Figure 1:
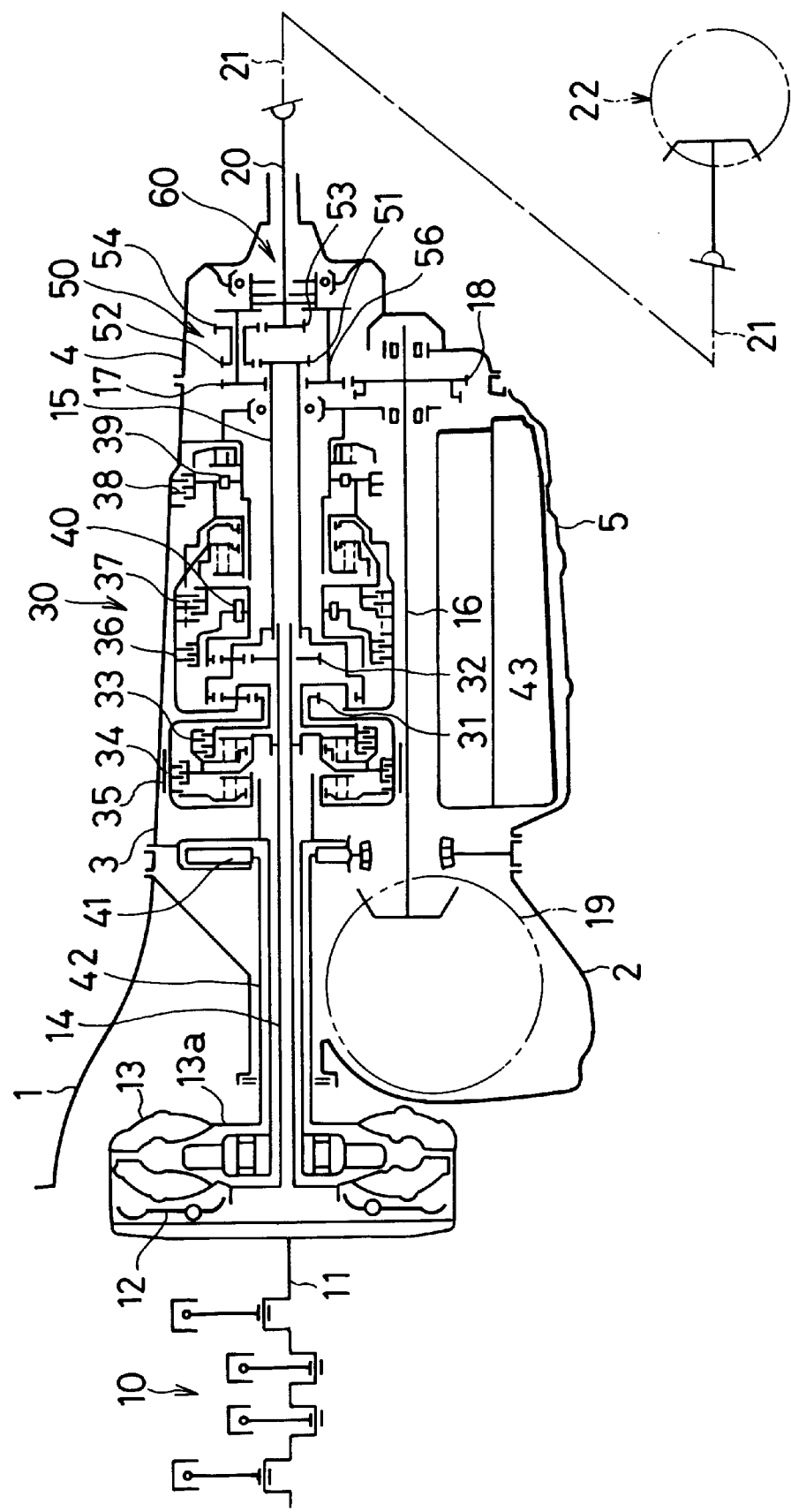
FIG. 1 is a schematic view of a driving force distribution control apparatus for a four wheel drive vehicle.

FIG. 1 shows an in-line transaxle type driving system to which the present invention is applied. In which, numeral 1 denotes a torque converter case, numeral 2 denotes a differential case, and numeral 3 denotes a transmission case, respectively. The transmission case 3 is connected at the end thereof with an extension case 4. Further, the bottom portion of the transmission case 3 is covered by an oil pan 5.

Numeral 10 denotes an engine whose crank shaft 11 is connected with a torque converter 13 including a lock-up clutch 12. The driving force of the torque converter 13 is transmitted to an automatic transmission 30 in the transmission case 3 through an input shaft 14.

An output shaft 15 of the automatic transmission is arranged coaxially with the input shaft 14 and connected coaxially with a center differential apparatus 50 accommodated in the extension case 4.

In the transmission case 3, a front drive shaft 16 is arranged in parallel with the input shaft 14 of the torque converter 13 and the output shaft 15 of the transmission. The front drive shaft 16 is connected at the rear end thereof with the center differential 50 through a pair of reduction gears 17 and 18 (more specifically, a transfer drive gear 17 and a transfer driven gear 18) and further connected at the front end thereof with a front differential apparatus 19 in the differential case 2 so as to transmit the driving force to front wheels.

On the other hand, the driving force is transmitted from the center differential 50 to a rear drive shaft 20 and then transmitted to rear wheels through a propeller shaft 21 connected with the rear drive shaft 20 and through a rear differential apparatus 22.

The automatic transmission 30 mainly comprises a front planetary gear set 31, a rear planetary gear set 32, a high clutch 33, a reverse clutch 34, a brake band 35, a forward clutch 36, an over-running clutch 37, a low and reverse clutch 38, and one-way clutches 39 and 40, so as to produce four forward and one reverse speed ratios by selectively engaging or disengaging these components. The engagement or disengagement is performed by a hydraulic system built in the automatic transmission 30.

The hydraulic system of the automatic transmission 30 comprises a hydraulic pump 41 which is coaxially connected with a drive shaft 42 extended from an impeller sleeve 13a of the torque converter 13 and a control valve body 43 which is installed in the oil pan 5. Hydraulic pressure generated by the hydraulic pump 41 is controlled by the control valve body 43 so as to operate miscellaneous components in the automatic transmission 30.

Figure 2:
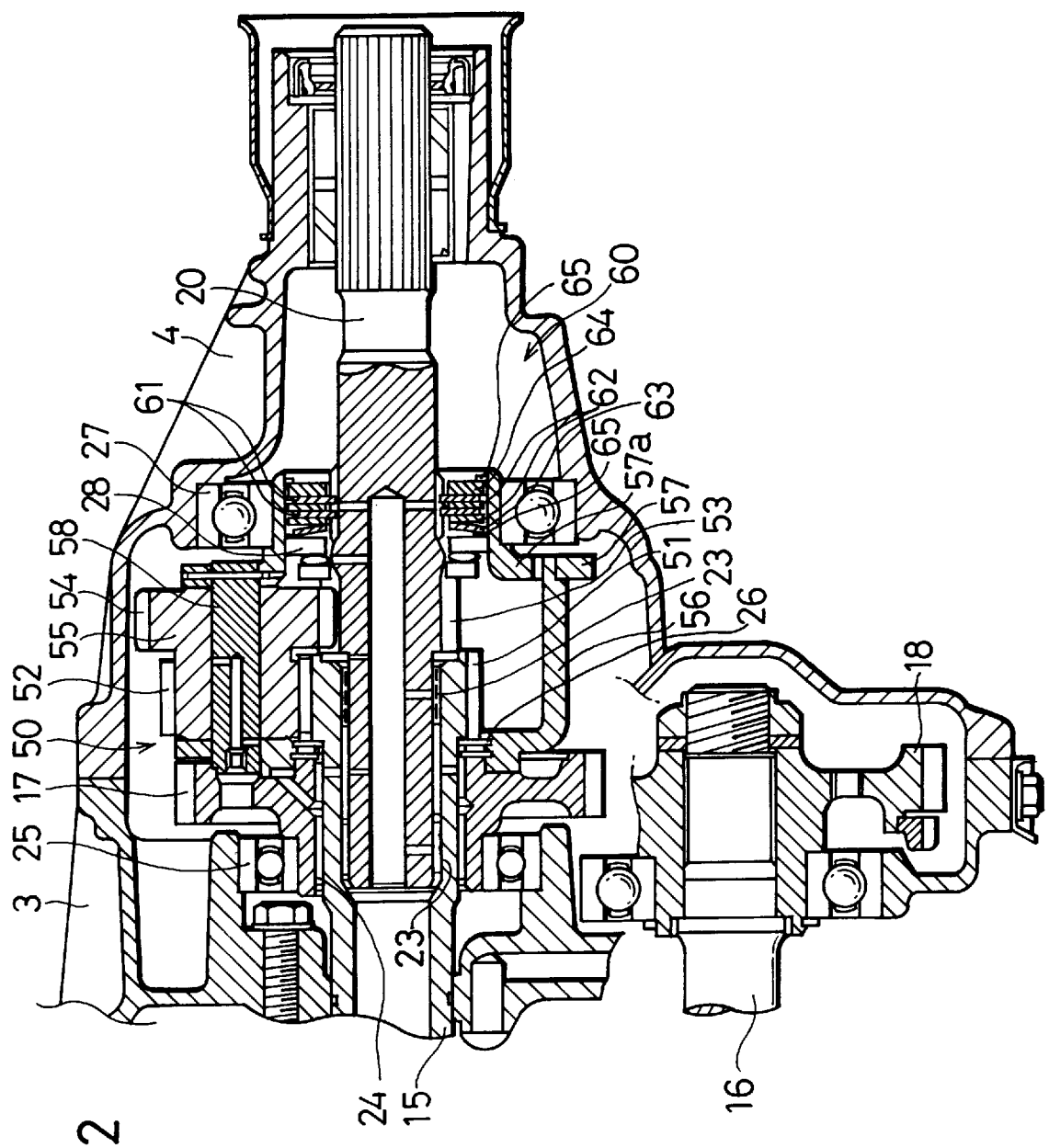
FIG. 2 is an enlarged sectional view of a center differential apparatus.

Describing the center differential apparatus 50 in detail with reference to FIG. 2, the output shaft 15 is coupled rotatably and coaxially with the rear drive shaft 20 through a radial bearing 23 and the transfer drive gear 17 is coupled rotatably with the output shaft 15 through a radial bearing 24 and a thrust bearing 26. The transfer drive gear 17 and the output shaft 15 are supported by a ball bearing 25 and a compound planetary type center differential apparatus 50 is provided coaxially among these three components, the output shaft 15, the rear drive shaft 20 and the transfer drive gear 17.

That is, a first sun gear 51 with a large diameter is formed in the output shaft 15 and this first sun gear 51 meshes with a first pinion 52, thus a first gear train being formed.

Further, a second sun gear 53 with a small diameter is formed in the rear drive shaft 20 and this second sun gear 53 meshes with a second pinion 54, thus a second gear train being formed.

The first and second pinions are integrally formed with a pinion member 55 and a plurality of the pinion members 55 (for example three pieces) are rotatably fit to a pinion shaft 58 which is fixed on a carrier 56, respectively.

The carrier 56 is connected at the front end thereof with the transfer drive gear 17 and power is outputted to the front wheels through the carrier 56.

The output shaft 15 is rotatably inserted from forward to the carrier 56 and, on the other hand, the rear drive shaft 20 is rotatably inserted from backward to the carrier 56. In the intermediate space of the carrier 56, the first sun gear 51 and the second sun gear 53 are accommodated. The first pinion 52 of each pinion member 55 meshes with the first sun gear 51 and the second pinion 54 meshes with the second sun gear 53.

The rear portion of the carrier 56 is connected with a supporting plate 57 and the supporting plate 57 is connected with a cylindrical section 57a. The cylindrical section 57a is supported by the extension case 4 through a ball bearing 27. Further, a thrust bearing 28 is inserted at the front end of the rear drive shaft 20 and an initial torque generating section 60 is provided between the cylindrical section 57a and the rear drive shaft 20.

The initial torque generating section 60 is formed as follows:

First, an internal spline is formed on the inner surface of the cylindrical section 57a and an external spline is formed on the outer periphery of the rear drive shaft 20. Then, a disc-shaped drive clutch plate 61 is inserted onto the external spline of the rear drive shaft 20 and after that a disc-shaped driven clutch plate 62 is inserted onto the internal spline of the cylindrical section 57a. Then, again the drive clutch plate 61 is inserted and after that the driven clutch plate is inserted in the same manner. Similarly, a plurality of drive and driven clutch plates are inserted interchangeably, thus a clutch plates body being formed. On the other hand, a coned disc spring 63 is fit at the front end of the clutch plates body and a retaining plate 64 is arranged at the rear end thereof. Further, finally, a snap ring is fit at both ends to fix the clutch plates body, the disc spring 63 and the retaining plat 64 in between. Thus formed clutch plates body generates friction torque between clutch plates 61 and 62 due to the pressure applied by the disc spring 63. That is, a friction torque is generated between the carrier 56 and the rear drive shaft 20, thereby an initial torque is effectively established between the output directed to the front wheels and the output directed to the rear wheels. The pressure of the disc spring 63 and the number of clutch plates are determined through experiments or calculations so as to obtain a required initial torque. Therefore, if it is effective, the initial torque generating section 60 may be constituted by a single clutch plate but not a multiple clutch plate as shown in this embodiment.

Generally, the differential limiting torque can be generated between the input side and the one output side, between the input side and the other output side or between both output sides. However, the differential limiting torque generated between both output sides is most effective to move torque from one output side to another output side, therefore, in this embodiment the case between both output sides will be treated.

In the compound planetary gear type center differential apparatus 50 as shown in this embodiment, the differential function is obtained by arranging the first and second pinions 52, 52 around the first and second sun gears 51, 53 respectively. Further, the standard torque distribution ratio between front and rear axles can be established so as to be 50:50 by properly selecting the pitch circle radiuses of gears 51, 52, 53 and 54 constituting the first and second gear trains.

Furthermore, the differential limiting function can be obtained by introducing helical gears to the first and second gear trains and differentiating helix angles between the first and second gear trains so as to generate a thrust load at the end surfaces of the pinion without being offset. Further, the thrust load bears a friction torque caused by the mesh of the first and second pinions. These fiction torques produce a differential limiting torque proportional to the input torque.

Figure 3:
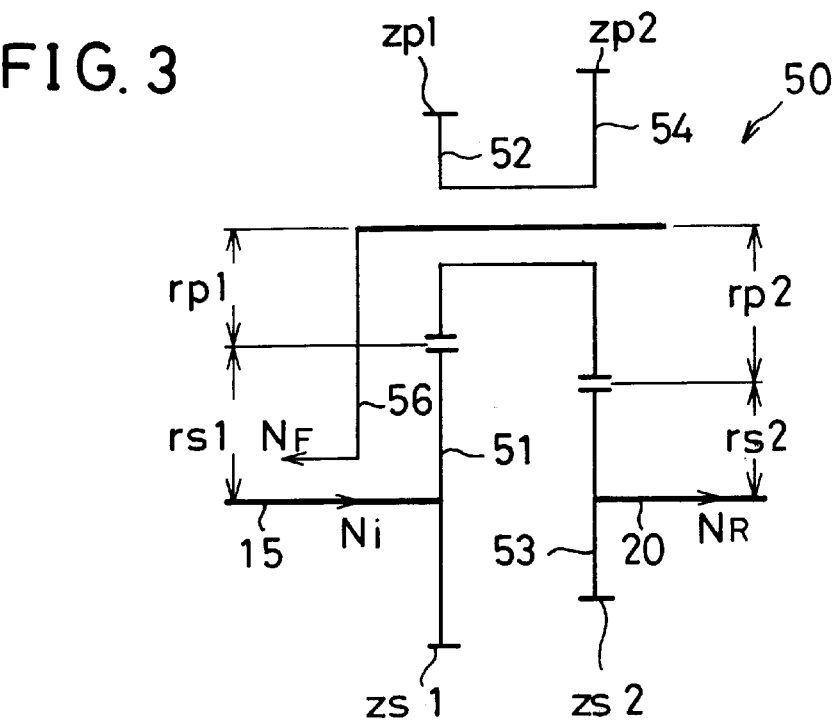
FIG. 3 is a view for explaining a differential function.

Next, the differential function will be described with reference to FIGS. 3,4 and 5.

Figure 4:
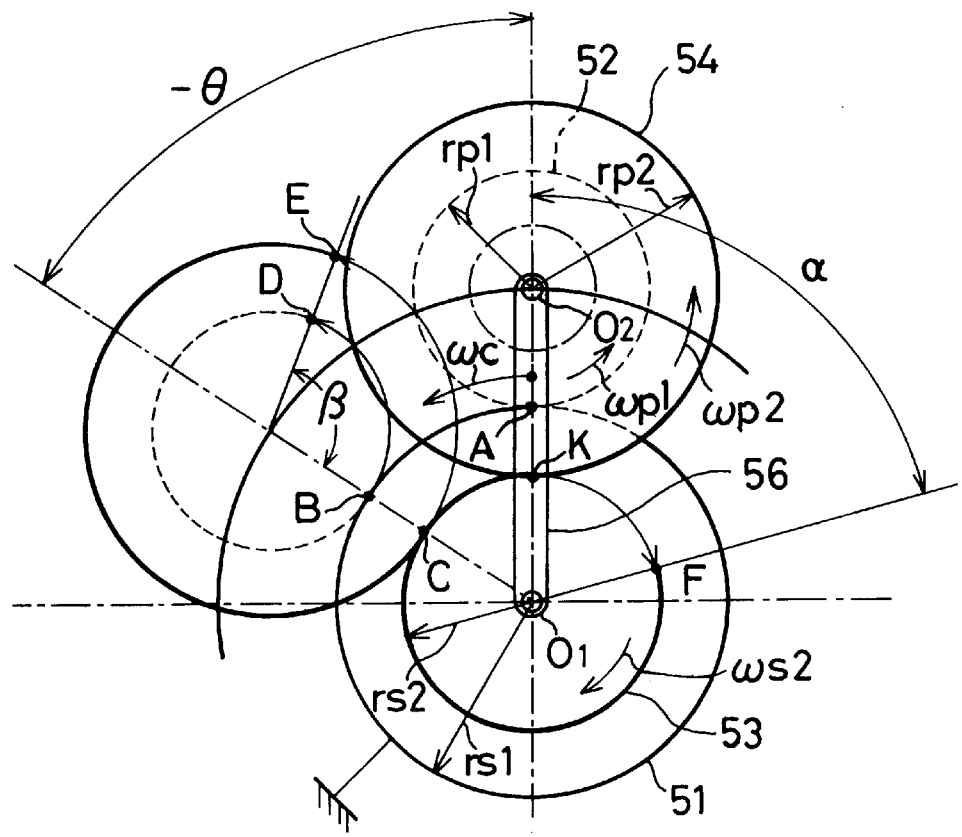
FIG. 4 is a view for explaining the operation of gears when a first sun gear is fixed.

Referring to FIG. 4, when the first sun gear 51 is fixed, the following equation is obtained on the circle with a radius $r_{s2}$:

$$(\text{Arc KF}) = (\text{Arc CF}) - (\text{Arc CK}) \quad (1)$$

Figure 5:
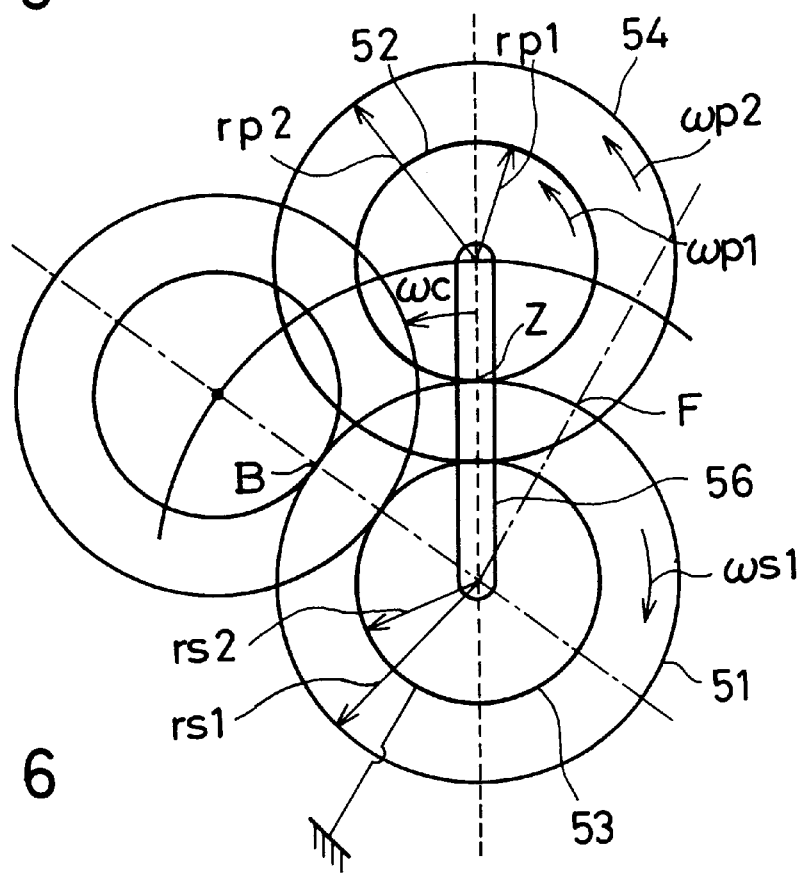
FIG. 5 is a view for explaining the operation of gears when a second sun gear is fixed.

Further, in FIG. 5, when the second sun gear 53 is fixed, the following equation is obtained on the circle with a radius rs1:

$$(\text{Arc ZF}) = (\text{Arc BF}) - (\text{Arc BZ}) \quad (2)$$

Further, the equations (1) and (2) are expressed respectively in the following equations:

$$\omega_{s2} \cdot r_{s2} = -\omega_{p2} \cdot r_{p2} + \omega_c \cdot r_{s2} \quad (3)$$

$$\omega_{s1} \cdot r_{s1} = -\omega_{p1} \cdot r_{p1} + \omega_c \cdot r_{s1} \quad (4)$$

were ($\omega_{s1}$, is a angular velocity of the first sun gear 51, $\omega_{s2}$ is an angular velocity of the second sun gear 53, $r_{s1}$, is a pitch circle radius of the first sun gear 51, $r_{s2}$ is a pitch circle radius of the second sun gear 53, ($\omega_{p1}$ is a angular velocity of the first pinion 52, $\omega_{p2}$ is an angular velocity of the second pinion 54, $rp_1$ is a pitch circle radius of the first pinion 52, $r_{p2}$ is a pitch circle radius of the second pinion 54, and $\omega_c$ an angular velocity of the carrier 56.

Since the first pinion 52 is integrate with the second pinion 54, $\omega_{p1}$ is equal to $\omega_{p2}$ therefore the equations (3) and (4) can be rewritten as follows:

$$\omega_c \cdot (r_{s2} - r_{s1} - r_{s2}/r_{p1}) = \omega_{s2} \cdot r_{s2} - \omega_{s1} \cdot r_{p2}/r_{p1} \quad (5)$$

Further, substituting rotational speed for angular velocity and number of teeth for pitch circle radius, the equation (5) can be expressed as follows:

$$N_F \cdot (Z_{s2} - Z_{s1} \cdot Z_{p2}/Z_{p1}) = N_R \cdot Z_{s2} \cdot N_i \cdot Z_{s1} \cdot Z_{p2}/Z_{p1} \quad (5)'$$

where the angular speed $\omega_{s1}$ of the first sun gear 51 is replaced with an input rotational speed $N_i$, the angular speed $\omega_c$ of the carrier 56 is replaced with a rotational speed $N_F$ of the front wheel, the angular speed $\omega_{s2}$ of the second sun gear 53 is replaced with a rotational speed $N_R$ of the rear wheel, the pitch circle radius $r_{s1}$ of the first sun gear 51 is replaced with a number of teeth $Z_{s1}$, the pitch circle radius $r_{s2}$ of the second sun gear 53 is replaced with a number of teeth $Z_{s2}$, the pitch circle radius $r_{p1}$, of the first pinion 52 is replaced with a number of teeth $Z_{p1}$, and the pitch circle radius $r_{p2}$ of the second pinion 54 is replaced with a number of teeth $Z_{p2}$.

Further, letting $Z_{p1}=24$, $Z_{p2}=24$, $Z_{s1}=30$ and $Z_{s2}=15$, the equation (5)' is:

$$N_R + N_F = 2N_i$$

When $N_i \neq 0$, an inequality $N_R > N_i > N_F$ or $N_F > N_i > N_R$ are formed between $N_R$, $N_F$ and $N_i$. It is understood from this that the front wheel rotational speed NF has the same rotational direction as the rear wheel rotational speed $N_R$, thus the differential relationship has been formed.

Next, a function of equal torque distribution will be described with reference to FIGS. 6, 7, 8 and 9.

The following equations are formed:

$$T_i = T_F + T_R \quad (6)$$

$$r_{s1} + r_{p1} = r_{s2} + r_{p2} \quad (7)$$

where $T_i$ is an input torque of the first sun gear 51, $T_F$ is a front side torque of the carrier 56, $T_R$ is a rear side torque of the second sun gear 53, $r_{s1}$ is an intermeshing pitch circle radius of the first sun gear 51, $r_{p1}$ is an intermeshing pitch circle radius of the first pinion 52, $r_{s2}$ is an intermeshing pitch circle radius of the second sun gear 53, and $r_{p2}$ is an intermeshing pitch circle radius of the second pinion 54.

Further, since a tangential load P acting at the meshing point between the first sun gear 51 and the pinion 52 is equal to a sum of a tangential load $P_1$ acting on the carrier 55 and a tangential load $P_2$ acting at the meshing point between the second sun gear 53 and the second pinion 54 and since $P=T_i/r_{s1}$, $P_1=T_F/(r_{s1}+r_{p1})$ and $P_2=T_R/r_{s2}$, the following equation is obtained:

$$T_i/r_{s1} = \{(T_F/(r_{s1}+r_{p1})\} + T_R/r_{s2} \quad (8)$$

Substituting the equations (6) and (7) into the equation (8)

$$T_F = (1 - r_{p1} \cdot r_{s2}/r_{s1} \cdot r_{p2}) \cdot T_i \quad (9)$$

$$T_R = (r_{p1} \cdot r_{s2}/r_{s1} \cdot r_{p2}) \cdot T_i \quad (10)$$

Thus, it is understood that the torque distribution between the front side torque $T_F$ and the rear side torque $T_R$ can be varied arbitrarily by changing the intermeshing pitch circle radiuses of the first and second sun gears 51, 53 and the first and second pinions 52, 54, respectively.

Here, replacing the intermeshing pitch circle radiuses $r_{s1}$, $r_{s1}$, $r_{p1}$ and $r_{p2}$ with the numbers of teeth $Z_{s1}$, $Z_{s2}$, $Z_{p1}$ and $Z_{p2}$ and substituting the aforementioned numbers ($Z_{p1}=24$, $Z_{p2}=24$, $Z_{s1}=30$ and $Z_{s2}=15$) into these numbers of teeth, $T_F=0.5\ T_i$ and $T_R=0.5\ T_i$ are obtained. Therefore, the torque distribution ratio between front and rear axles becomes around 50:50 by which torque is equally distributed.

Describing the differential limiting function, the differential limiting torque of the center differential apparatus is an addition of an initial torque and a friction torque obtained from the friction force generated by the mesh between the first sun gear 51 and the first pinion 52 and between the second sun gear 53 and the second pinion 54.

The initial torque is a friction torque generated by the pressure of the disc spring 63 of the initial torque generating section 60 and therefore this torque is active from the start of the differential rotation as well as during the differential rotation.

The first and second sun gears 51, 53 and the first and second pinions 52, 54 are composed of helical gears, respectively. Since the first and second pinions 52, 54 have a helix angle different from each other, thrust forces acting at each of the meshing points with the first and second sun gears 51, 53 pushes the pinion shaft in the axial direction, thereby sliding friction forces are generated between the carrier 56 or the supporting plate 57 and the wall surfaces of these. Further, the resultant force of the separating loads and the tangential loads acting at the meshing points of the first and second gear trains is applied to the pinion shaft 58 and as a result rotating friction forces are generated between the first and second pinions 52, 54 and the pinion shaft 58. Thus, these friction forces are converted into a friction torque, i.e., a differential limiting torque acting in the opposite direction to the rotational direction of the pinions. The differential limiting torque is proportional to the input torque because those friction forces are generated in proportion to the input torque.

The rotating direction of the pinion varies according to which is larger, the front wheel rotation number NF or the rear wheel rotation number $N_R$ and therefore the applied differential limiting torque also varies. As a result of this, the driving force distribution between front and rear axles changes in accordance with the difference of the differential limiting torque.

Figure 6:
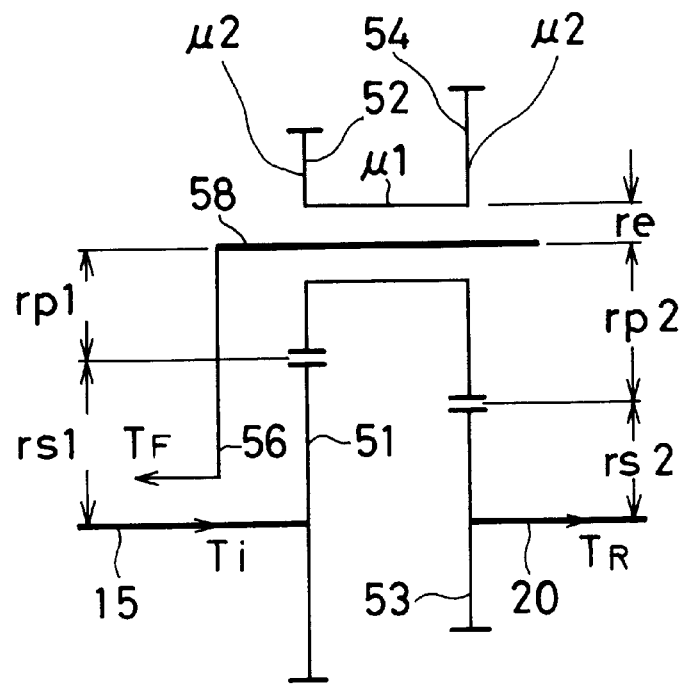
FIG. 6 is a view for explaining a driving force distribution function and a differential limiting function.
Figure 7:
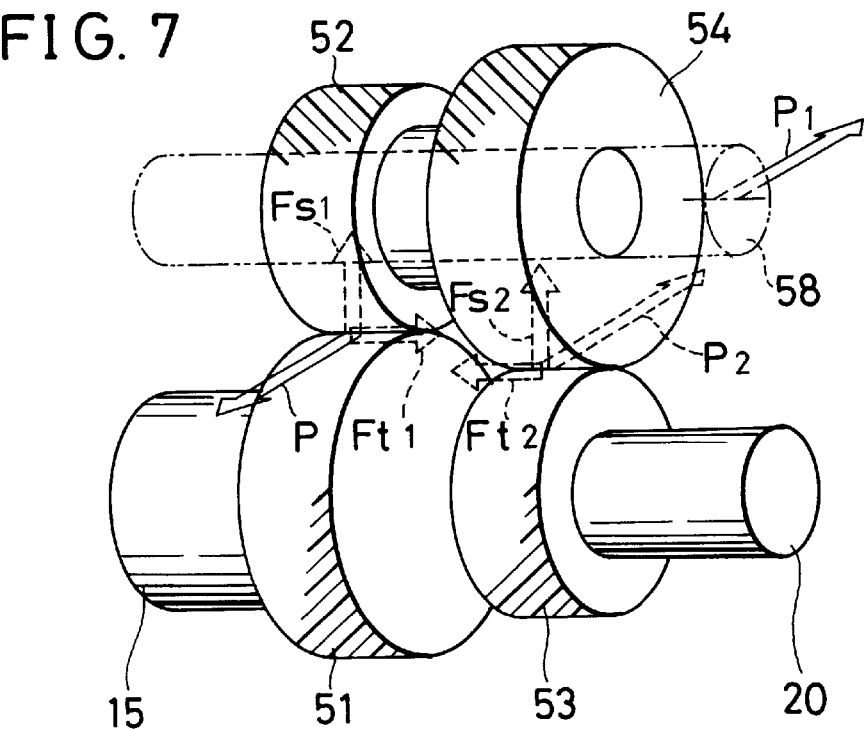
FIG. 7 is a view for explaining loads generated in gears.
Figure 8:
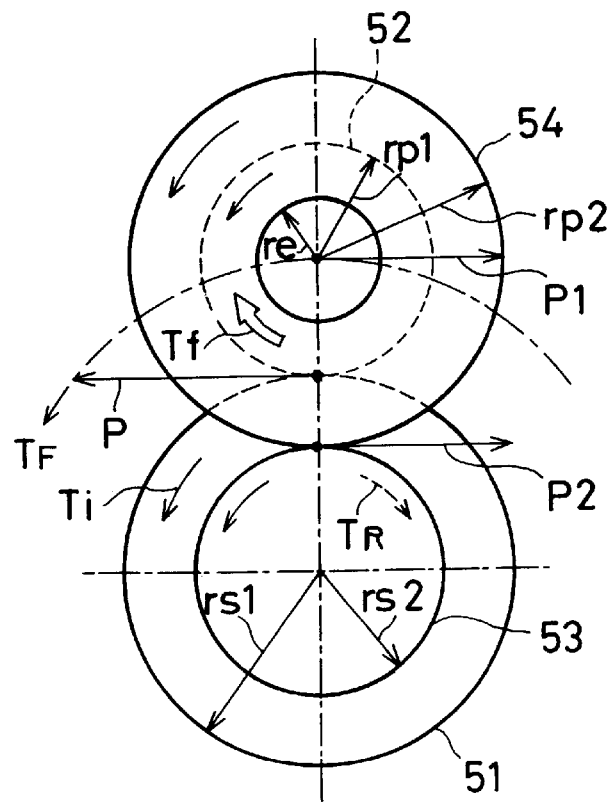
FIG. 8 is a view for explaining the operation of gears when a front wheel speed is larger than a rear wheel speed.

First, the case of $N_F > N_R$ will be described with reference to FIGS. 6, 7 and 8. The case of $N_F > N_R$ is considered to be a case where the vehicle is turning a circle or the front wheel is in a slip state. Under this condition, when the input torque $T_i$ is inputted to the first sun gear 51 in the counterclockwise direction as shown in FIG. 8, the first and second pinions 52, 54 rotate on the pinion shaft in the same direction while revolving around the first and second sun gears 51, 53 and therefore the carrier 56 rotate in the same counterclockwise direction. Consequently, the friction torque $T_f$ of the pinion side acts in the clockwise direction.

The separating load $F_{s1}$ and the thrust load $F_{t1}$ acting between the first sun gear 51 and the first pinion 52 are expressed respectively as follows:

$$F_{s1} = P \cdot \tan \alpha_1 / \cos \beta_1$$

$$F_{t1} = P \cdot \tan \beta_1$$

where P is a tangential load acting between the first sun gear 51 and the first pinion 52, $\alpha_1$ is a pressure angle of the first pinion 52 and $\beta_1$ is a helix angle thereof.

Therefore, the resultant force $N_{p1}$ acting on the pinion shaft 58 is calculated as follows:

$$N_{p1} = (P^2 + F_{s1}^2)^{1/2} \tag{11}$$
$$= P\{1 + (\tan\alpha_1 / \cos\beta_1)^2\}^{1/2}$$

Similarly, the separating load $F_{s2}$ and the thrust load $F_{t2}$ acting between the second sun gear 53 and the second pinion 54 are expressed as follows:

$$F_{s2} = P_2 \cdot \tan \alpha_2 / \cos \beta_2$$

$$F_{t2} = P_2 \cdot \tan \beta_2$$

where $P_2$ is a tangential load acting between the second sun gear 53 and the second pinion 54, $\alpha_2$ is a pressure angle of the second pinion 54 and $\beta_2$ is a helix angle thereof. Therefore, the resultant force $N_{p2}$ acting on the pinion shaft 58 is calculated as follows:

$$N_{p2} = (P_2^2 + F_{s2}^2)^{1/2} \tag{12}$$
$$= P_2\{1 + (\tan\alpha_2 / \cos\beta_2)^2\}^{1/2}$$

Further, the residual thrust load $\Delta F_t$ which is generated in the first and second pinions 52 and 54 is as follows:

$$\Delta F_t = F_{t2} - F_{t1} \tag{13}$$
$$= P_2 \cdot \tan\beta_2 - P \cdot \tan\beta_1$$

The friction torque $T_f$ is a sum of the friction force by the resultant force of $N_{p1}$ and $N_{p2}$ and the friction force by the residual thrust force $\Delta Ft$ and it is expressed as follows:

$$T_f = \mu_1 \cdot re \cdot (N_{p1} + N_{p2}) + \Delta F_t \cdot \mu_2 \cdot n \cdot 2/3 \cdot \{(rd^3 - re^3)/(rd^2 - re^2)\} \tag{14}$$

where $\mu_1$ is a friction coefficient between the pinion member 55 and the pinion shaft 58, re is a radius of the inner diameter, $\mu_2$ is a friction coefficient between the wall of the carrier 56 or the supporting plate 57 and the first and second pinions 52 and 54, rd is a radius of the friction contact surface between the pinions 52 and 54, and n is a number of contact surfaces.

The following equation is obtained from the torque balance of the first and second pinions 52 and 54:

$$T_f + P \cdot r_{p1} = P_2 \cdot r_{p2} \tag{15}$$

Further, the equation (10) is rewritten by adding friction torque $T_f$ as follows:

$$T_R = T_i(r_{p1} \cdot r_{s2} / r_{s1} \cdot r_{p2}) + T_f \cdot r_{s2}/r_{p2} \tag{16}$$

Taking the initial torque $T_c$ generated at the initial torque generating section 60 into consideration, replacing the intermeshing pitch circle radiuses $r_{s1}$, $r_{s2}$, $r_{p1}$ and $r_{p2}$ with the number of teeth of each gear $Z_{s1}$, $Z_{s2}$, $Z_{p1}$ and $Z_{p2}$ and further substituting the aforementioned numbers of teeth ($Z_{p1}$=24, $Z_{p2}$=24, $Z_{s1}$=30 and $Z_{s2}$=15) into these numbers of teeth, the above formula (16) can be written as follows:

$$T_R = 0.5 T_i + 0.625 T_f + T_c \tag{17}$$

Since $T_i = T_F + T_R$, substituting this into the formula (16), the following formula is obtained:

$$T_F = T_i(1 - r_{p1} \cdot r_{s2}/r_{s1} \cdot r_{p2}) - T_f \cdot r_{s2}/r_{p2} \tag{18}$$

Further, taking the initial torque $T_c$ into consideration, the formula (18) is expressed as follows:

$$T_F = 0.5 T_i - 0.625 T_f - T_c \tag{19}$$

Here, it is understood that the differential limiting torque $T_f \cdot r_{s2}/r_{p2}$ which is proportional to the friction torque $T_f$ and the initial torque $T_c$ by the initial torque generating section 60 are generated and that the magnitude of distributed torque to the front wheel is decreased by the amount of differential limiting torque and the magnitude of distributed torque to the rear wheel is increased by as much. Further, it is understood that the differential limiting torque is proportional to the input torque because the resultant forces $N_{p1}$, $N_{p2}$ and the remaining thrust force $\Delta F_t$ are proportional to the input torque, respectively.

On the other hand, the remaining thrust force $\Delta F_t$ can be changed by adjusting the helix angles $\beta_1$, $\beta_2$ of the first and second pinions 52, 54 respectively. Further, it is possible to change the friction coefficient $\mu_1$ by altering the type of the bearing (for example, needle bearing, bushing or the like) between the pinion member 55 and the pinion shaft 58. Further again, the friction torque generated in the multiple disc clutch of the initial torque generating section 60 can be changed by properly selecting the clutch characteristic or adjusting the pressure applied to the clutch. Thus, the magnitude of the differential limiting torque can be established to be various values by way of the friction torque $T_f$ or the initial torque $T_c$.

Figure 9:
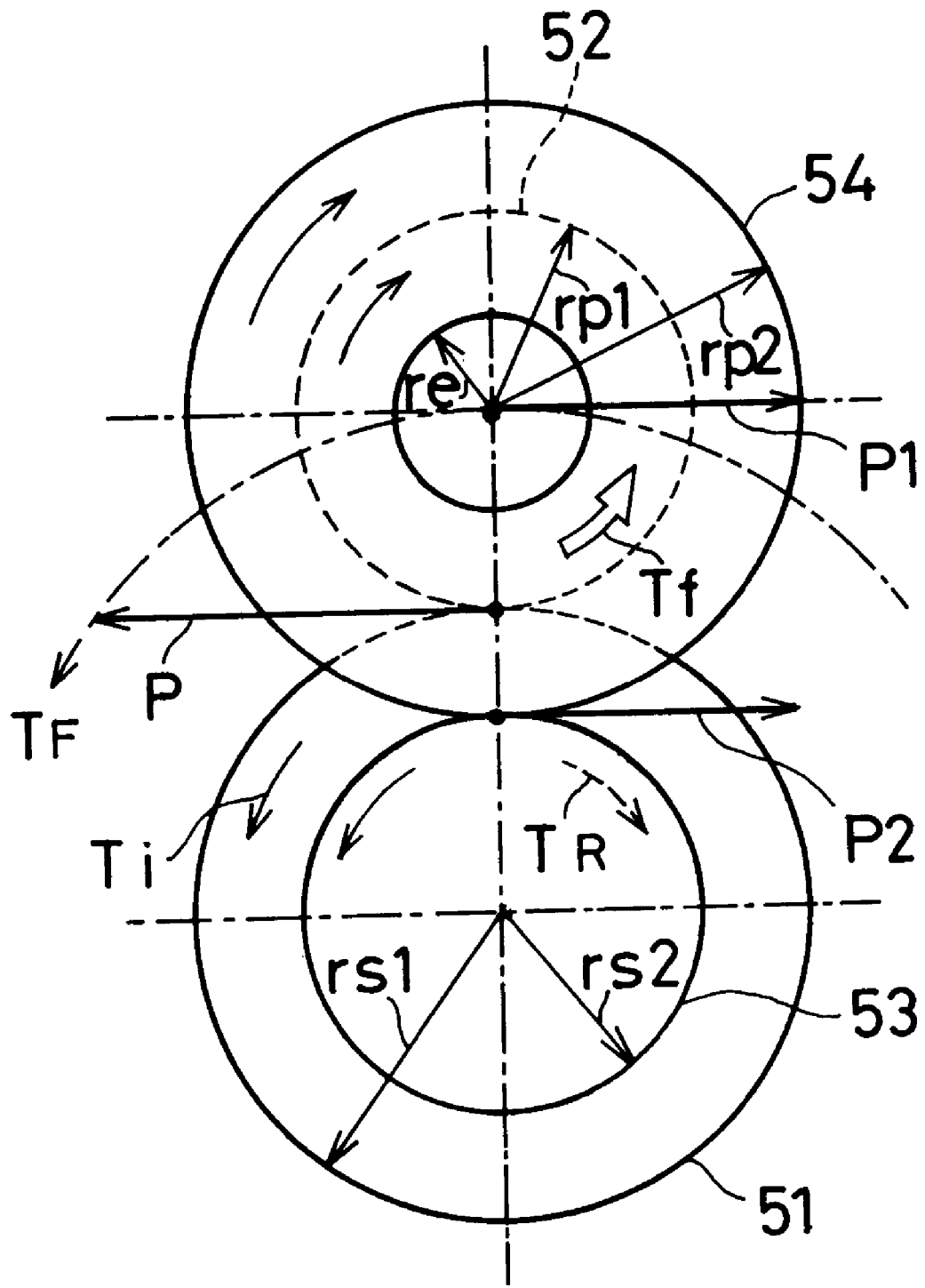
FIG. 9 is a view for explaining the operation of gears when a front wheel speed is smaller than a rear wheel speed.

Next, the case of $N_R>N_F$ will be described with reference to FIG. 9. Under this condition, the first and second pinions 52, 54 revolve around the first sun gear 51 and the second sun gear 53 respectively while rotating on the pinion shaft 58 in the clockwise direction and the friction torque $T_f$ acts in the unticlockwise direction. Therefore, the torque balance within the first and second pinions 52, 54 is expressed in the following equation:

$$T_f + P_2 \cdot r_{s2} = P \cdot r_{p1} \tag{20}$$

Undertaking the same calculation as before, the front wheel torque $T_F$ and the rear wheel torque $Y_R$ are calculated as follows:

$$T_F = T_i(1 - r_{p1} \cdot r_{s2}/r_{s1} \cdot r_{p2}) + T_f r_{s2}/r_{p2} \tag{21}$$

$$T_F = 0.5 T_i + 0.625 T_f + T_c \tag{22}$$

$$T_R = T_i(r_{p1} \cdot r_{s2}/r_{s1} \cdot r_{p2}) - T_f r_{s2}/r_{p2} \tag{23}$$

$$T_R = 0.5 T_i - 0.625 T_f - T_c \tag{24}$$

Thus, also under this condition, it is understood that the same differential limiting torque, $T_f r_{s2}/r_{p2}$ and $T_c$ are generated. Further, it is understood that, inversely to the case of $N_F>N_R$, the magnitude of the front wheel torque $T_F$ is increased by the amount of the differential limiting torque and the magnitude of the rear wheel torque $T_R$ is decreased by as much.

An operation of a four wheel drive vehicle thus constituted will be described using a torque characteristic diagram shown in FIG. 10.

First, a driving force from the engine 10 is inputted to the transmission 30 through the input shaft 14 and the driving force converted by the automatic transmission is inputted to the first sun gear 51 of the center differential apparatus 50 through the transmission output shaft 15.

Further, the driving force is divided into two ways, one being distributed to the second sun gear 53 through the first and second pinions 52, 54 and another being distributed to the carrier 56 supported by the first and second pinions 52, 54. The driving force distributed to the sun gear 53 is transmitted to the rear wheels through the rear drive shaft 20, the propeller shaft 21 and the rear differential apparatus 22. On the other hand, the driving force distributed to the carrier 56 is transmitted to the front wheels through the reduction gears 17, 18, the front drive shaft 16 and the front differential apparatus 19. Thus, the driving force is distributed to four wheels for a four-wheel drive.

When the vehicle travels in a straight line, since $N_F = N_R$, the second sun gear 53 rotates in the same direction and at the same speed as the carrier 56 does while the first and second pinions 52, 54 stop rotation around the pinion shaft 58.

Because of the inoperative first and second pinions 52, 54, there arises no friction torque between the pinions and the carrier. Further, because there arises no slip between the carrier 56 and the rear drive shaft 20, the initial torque generating section generates no friction in its clutch mechanism.

Figure 10:
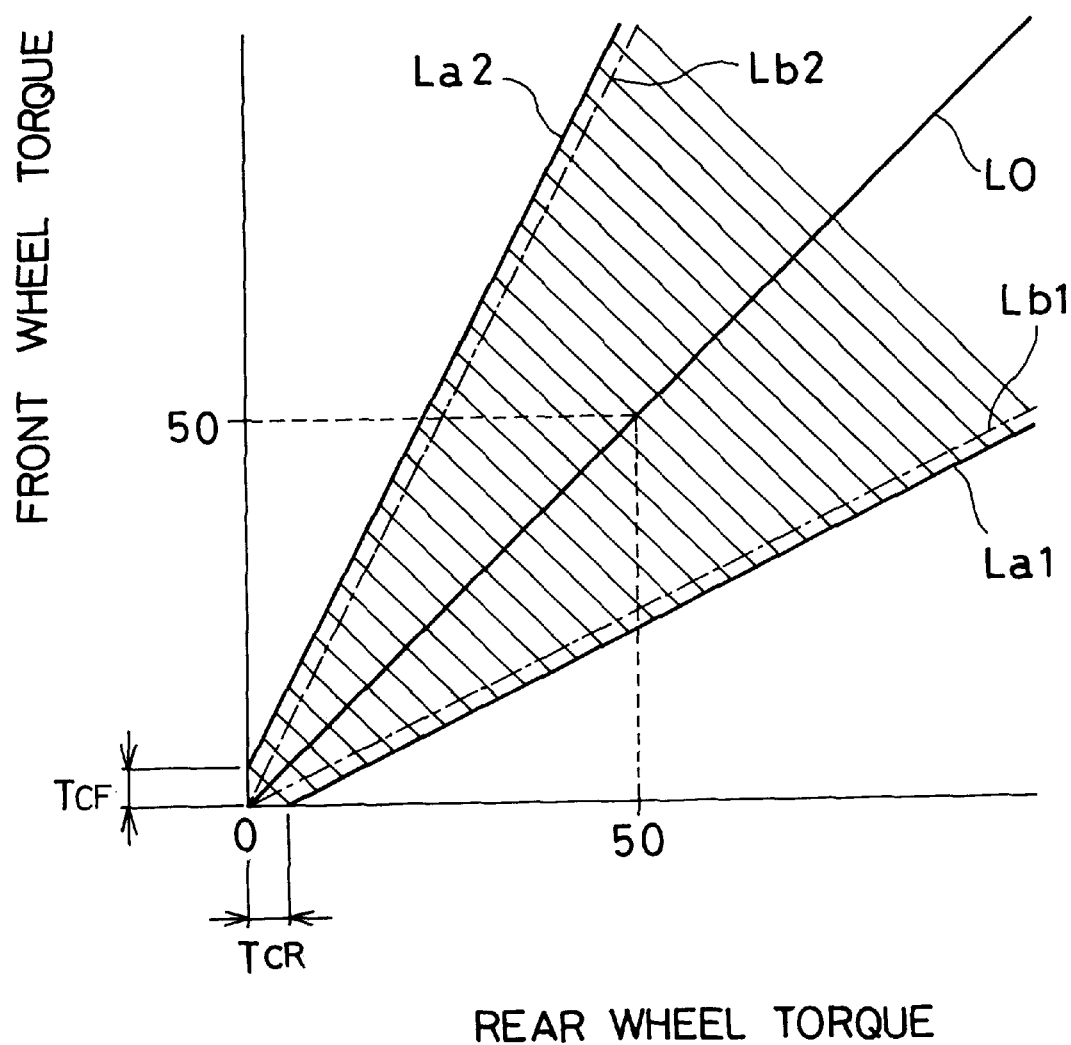
FIG. 10 is a diagram showing a torque distribution control characteristic between front and rear axles.

As a result, the front wheel side torque $T_F$ outputted from the carrier 56 and the rear wheel side torque $T_R$ outputted from the second sun gear 53 are established at a standard torque distribution ratio of around 50:50 (straight line $L_0$ shown in FIG. 10).

Assuming such a state as the vehicle enters into a rough road or a split $\mu$ road (road having a road surface with a partially low friction coefficient) while turning, this state provides a condition of $N_F>N_R$ which causes a slip between the carrier 56 and the rear drive shaft 20. When the slip is caused, the clutch mechanism of the initial torque generating section 60 produces a friction torque, namely an initial torque, as shown by a symbol $T_{CR}$ in FIG. 10. This initial torque prevents the vehicle from coming into a slip state.

Further, in the case of $N_F>N_R$, that is, the case where the vehicle makes a turn or the front wheels are in a slip state, the first and second pinions 52, 54 starts a planetary rotation, thereby a differential movement is operative between the front and rear wheels so as to make a smooth turn.

Further, the planetary rotation of the first and second pinions 52, 54 is accompanied by a thrust load produced from the difference in the helix angles thereof. The thrust load acts at the portions between the end surface of the first and second pinions 52, 54 and the wall surface of the carrier 56 or the supporting plate 57. Further, the resultant force of the separating and tangential forces at the meshing portions of the gears acts on the pinion shaft 58. Both of the thrust load and resultant force generate a friction torque in the opposite direction to the rotational direction of the pinions and this friction torque acts as a differential limiting torque on the center differential apparatus 50. A straight line $L_{b1}$ shown in FIG. 10 indicates a differential limiting torque excluding the initial torque.

Under this condition, since the differential limiting torque acts so as to restrict the rotation of the carrier 56, that amount of the differential limiting torque transfers to the rear wheel side and a larger amount of torque is distributed to the rear wheels and a smaller amount of torque is distributed to the front wheels, as shown by a straight line $L_{a1}$ of FIG. 10. As a result, an excellent turning ability and handling ability are provided with the vehicle. Further, when the vehicle causes a slip at the front wheels during running in a straight line, this torque distribution characteristic saves the vehicle from slipping.

On the other hand, describing the case of $N_R>N_F$, this case happens when the vehicle escapes from a slippery road such as muddy road, gravel road or frozen road. Also in this case, an initial torque generates in the clutch mechanism of the initial torque generating apparatus, as shown by a symbol $T_{CF}$ in FIG. 10. This initial torque prevents the vehicle from slipping effectively.

When $N_R>N_F$, in addition to the initial torque, a friction torque is generated by the planetary rotation of the first and second pinions 52, 54 in an opposite direction to the case $N_F>N_R$.

Under this condition, a differential limiting torque acts so as to restrict the rotation of the second sun gear 53 and as a result that amount of the differential limiting torque transfers to the front wheel side. As shown by a straight line $L_{b2}$, a sum of the standard torque and the differential limiting torque is distributed to the front wheels.

Because the differential limiting torque generates in proportional to the input torque, the distribution ratio between front and rear axles is always constant, therefore the differential limiting ability is always displayed at a constant rate.

FIG. 11 shows an example of a modified initial torque generating section. In this example of modification, the initial torque generating section 70 is disposed at the rear end of the center differential apparatus. The initial torque generating section 70 is accommodated in an extension case 71.

The carrier 56 is connected at the rear end thereof with a supporting plate 72. The supporting plate 72 is connected at the rear end thereof with a cylinder portion 72a. Further, a cylinder section 72b is extended backward from the cylinder section 72a. On the other hand, a hub 73 is coupled with the rear drive shaft 20. The initial torque generating section 70 is constituted as follows.

Inner splines are provided on the inner periphery surface of the cylinder portion 72b and outer splines are formed on the outer periphery surface of the hub 73. Disc-shaped drive clutch plates 61 and driven clutch plates 62 are inserted into the outer and inner splines interchangeably, respectively. On the one end of the clutch plates, there is provided with a coned disc spring 63 so as to apply pressure to the clutch plates. A retaining plate 64 is provided on both ends of the clutch plates so as to put the clutch plates and the disc spring 63 in between. Further, a pair of snap rings 65 are inserted in order to fix the whole body.

In summary, since the center differential apparatus according to the present invention is constituted such that the differential limiting torque is obtained by the loads generated at the meshing portion of helical gears, the apparatus has a simpler construction than the differential limiting apparatus constituted by the combination of worm gears and worm wheels or by the combination of side gears and pinions. Further, the center differential apparatus according to the present invention can accommodate the initial torque generating apparatus having an enough torque generating capability in a compact space. Further, since this center differential apparatus is constituted such that the differential limiting function obtained is proportional to input torque, it is easy to control the vehicle behavior with fine accelerator operations. Furthermore, since the apparatus can provide the vehicle with an excellent maneuverability on a slippery road because of the initial torque generating apparatus built in the apparatus.

Further, again, in the center differential apparatus, since it is possible to establish the number of teeth so as to distribute a standard torque to front and rear wheels with a torque distribution ratio of 50:50, the vehicle can make a smooth turn on a rough road, or can escape from a slippery road without causing slips.

In this embodiment according to the present invention, the planetary gear mechanism includes helical gears but it may use spur gears instead of helical gears.

Further, the present invention has been described in an example using an in-line transfer axle type automatic transmission, however it may be applied to other type of transmissions such as a transversely mounting type transmission.

While the best mode of the invention has been described above and certain details have been disclosed for the purpose of illustrating the best mode for practicing the invention, it will be apparent to those skilled in the art that various changes and modifications may be made thereto without departing from the scope of the invention as set forth in the following claims.

What is claimed is:

1. A driving force distribution system for a four-wheel drive vehicle having an engine mounted thereon for supplying a driving force to a front drive shaft and a rear drive shaft, a torque converter connected to said engine via a lock-up clutch for controlling said driving force, an input shaft directly and coaxially connected to said torque converter, and an automatic transmission connected to said input shaft for changing an engine speed in accordance with driving conditions of said vehicle and for transmitting said driving force to both front and rear drive shafts via a transmission output shaft, comprising:

a first sun gear coaxially connected to said output shaft;

a plurality of first pinions meshed with said first sun gear and supported by a carrier;

a second pinion with a different number of teeth integrally formed at another side of said first pinion;

a second sun gear coaxially connected to said rear drive shaft and meshed with said second pinion; and initial torque generating means interposed between said carrier and said rear drive shaft for generating a differential torque between said front and rear drive shafts in a compact configuration so as to easily control said vehicle on a slippery road even when only one wheel slips or floats.

2. The apparatus according to claim 1, wherein said initial torque generating means include a clutch mechanism composed of a multiple disc clutch assembly for generating friction and a disc spring for applying a specified magnitude of pressure to said clutch assembly.

3. The apparatus according to claim 1, wherein said initial torque generating means include a clutch mechanism composed of a single disc clutch assembly for generating friction and a disc spring for applying a specified magnitude of pressure to said clutch assembly.

4. A driving force distribution system for a four-wheel drive vehicle having an engine mounted thereon for supplying a driving force to a front drive shaft and a rear drive shaft, a torque converter connected to said engine via a lock-up clutch for controlling said driving force, an input shaft directly and coaxially connected to said torque converter, and an automatic transmission connected to said input shaft for changing an engine speed in accordance with driving conditions of said vehicle and for transmitting said driving force to both front and rear drive shafts via a transmission output shaft, consisting essentially of:

a first sun gear coaxially connected to said output shaft;

a plurality of first pinions meshed with said first sun gear and supported by a carrier;

a second pinion with a different number of teeth integrally formed at another side of said first pinion;

a second sun gear coaxially connected to said rear drive shaft and meshed with said second pinion; and initial torque generating means interposed between said carrier and said rear drive shaft for generating a differential torque between said front and rear drive shafts in a compact configuration so as to easily control said vehicle on a slippery road even when only one wheel slips or floats.

* * * * *